United States Patent Office 3,483,204
Patented Dec. 9, 1969

3,483,204
ADAMANTYL THIADIAZOLES
Venkatachala L. Narayanan, North Brunswick, and Jack Bernstein, New Brunswick, N.J., assignors to E. R. Squibb & Sons, Inc., New York, N.Y., a corporation of Delaware
No Drawing. Continuation-in-part of application Ser. No. 523,249, Jan. 27, 1966. This application Sept. 26, 1967, Ser. No. 670,756
Int. Cl. C07d 91/62
U.S. Cl. 260—253
7 Claims

ABSTRACT OF THE DISCLOSURE

This invention relates to new adamantyl thiadiazoles having the general formula

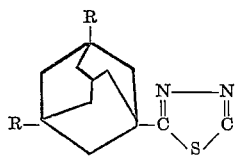

and acid addition salts thereof. Each R represents hydrogen, halogen, trihalomethyl, lower alkyl, lower alkoxy, phenyl, amino, lower alkanoylamino, lower alkylamino or di-lower alkylamino and B represents a basic nitrogen-containing radical. These compounds are antifungal agents.

---

This application is a continuation-in-part of application Ser. No. 523,249, filed Jan. 27, 1966, and now abandoned

SUMMARY O F THE INVENTION

This invention relates to novel adamantyl thiadiazole compounds having the structural formula (I)
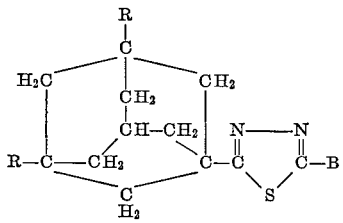

and to salts thereof.

Each R in Formula I represents hydrogen, halogen, trihalomethyl, lower alkyl, lower alkoxy, phenyl, amino, lower alkanoylamino, lower alkylamino or di-lower alkylamino. They may be the same or different in a given compound.

B represents the basic nitrogen-containing radical symbolized by (II)

In Formula II, $R_1$ and $R_2$ each represents hydrogen, adamantyl, substituted adamantyl, lower alkyl, hydroxy-lower alkyl, phenyl-lower alkyl and N-(lower alkyl)phenyl(lower alkyl), cyclo-lower alkyl, forming such basic groups as amino, lower alkylamino, e.g., methylamino, ethylamino, lower alkanoylamino, e.g., acetylamino, di(lower alkyl)amino, e.g., dimethylamino, diethylamino, dipropylamino, (hydroxy-lower alkyl)-amino, e.g., hydroxyethylamino, di(hydroxy-lower alkyl)amino, e.g., di-(hydroxyethyl)amino, phenyl(lower alkyl)amino, e.g., benzylamino, phenethylamino, cyclophentylamino, cyclohexylamino, N-(lower alkyl)phenyl(lower alkyl)amino, e.g., N-methylbenzylamino, adamantylamino and the like.

In addition, the nitrogen may join with the groups represented by $R_1$ and $R_2$ to form a 5 to 7 membered monocyclic heterocyclic containing, if desired, an oxygen, sulfur or an additional nitrogen atom (not more than two hetero atoms altogether), that is, the two symbols $R_1$ and $R_2$ represent together tetramethylene, pentamethylene, hexamethylene, oxatetramethylene, oxapentamethylene, azatetramethylene, azapentamethylene, azahexamethylene, thiatetramethylene or thiapentamethylene. The heterocyclic group may also be substituted by one or two groups represented by R.

Thus heterocyclic groups represented by B and the radical II include basic 5 to 7 membered N-heterocyclics having less than 12 atoms in the radical, for example, piperidino, 2-, 3- or 4-piperidyl, (lower alkyl)piperidino, e.g., methylpiperidino, 2-, 3- or 4-methylpiperidyl, di(lower alkyl)piperidino, e.g., dimethyl piperidino, 2-, 3- or 4-lower alkylpiperidyl, N-(lower alkyl)piperidyl, (lower alkoxy)piperidino, e.g., methoxypiperidino, homopiperidino, pyrrolidino, (lower alkyl)pyrrolidino, e.g., methylpyrrolidino, di(lower alkyl)pyrrolidino, e.g., dimethylpyrrolidino, (lower alkoxy)pyrrolidino, e.g., ethoxypyrrolidino, pyrrolidyl, lower alkylpyrrolidyl, morpholino, (lower alkyl)morpholine, e.g., N-methylmorpholino or 2-methylmorpholino, di(lower alkyl)morpholino, e.g., 2,3-dimethylmorpholino, (lower alkoxy)morpholino, e.g., ethoxymorpholino, thiamorpholino, (lower alkyl)thiamorpholino, e.g., N-methylthiamorpholino or 2-methylthiamorpholino, di(lower alkyl)thiamorpholino, e.g., 2,3-diethylthiamorpholino, 2,3-dimethylthiamorpholino, (lower alkoxy)thiamorpholino, e.g., 2-methoxythiamorpholino, piperazino, (lower alkyl)piperazino, e.g., 4-methylpiperazino, 2-methylpiperazino, hydroxy lower alkyl piperazino, e.g., 4-(2-hydroxyethyl)piperazino, di(lower alkyl) piperazino, e.g., 2,3-dimethylpiperazino, hexamethyleneimino, homopiperazino, and adamantylamino.

The lower alkyl groups represented by the symbols include straight and branched chain saturated aliphatic groups such as methyl, ethyl, propyl, isopropyl, butyl, isobutyl, t-butyl, amyl, isoamyl, hexyl and the like. Methyl and ethyl are preferred. The lower alkoxy groups contain alkyl groups of the same character attached to the oxygen atom.

Each of the four halogens is contemplated by the terms "halo" and "trihalomethyl," but in the case of the halogens themselves chlorine and bromine are preferred while trifluoromethyl is the preferred trihalomethyl group.

The lower alkanoyl groups are the acyl moieties derived from lower fatty acids containing alkyl groups of the character described above and include, for example, acetyl, propionyl, butyryl and the like.

The adamantyl groups in Formula I including those represented by $R_1$ encompass unsubstituted adamantyl and simply substituted adamantyl (the substituted groups preferably bearing the substituent in the 3- and/or 5-position), e.g., 3-R, 5-R-adamantyl, wherein each has the same meaning as above.

The preferred members of the class defined by Formula I are those wherein each R is hydrogen and the radical II is amino or di(lower alkyl)amino, especially dimethylamino.

The compounds of Formula I form acid addition salts with various inorganic and organic acids. Illustrative salts include the hydrohalides, e.g., hydrobromide, hydrochloride, hydroiodide, sulfate, nitrate, phosphate, borate, acetate, oxalate, tartrate, malate, citrate, succinate, benzoate, pamoate, ascorbate, salicylate, theophyllinate, camphorsulfonate, alkanesulfonate, e.g., methanesulfonate, arylsulfonate, e.g., benzenesulfonate, toluenesulfonate, etc. It is frequently convenient to effect the purification of the product by forming the acid salt. The free base may then be obtained therefrom by neutralization with an alkali hydroxide such as ammonium hydroxide.

The new compounds of this invention having the Formula I may be prepared by the following series of reactions. An unsubstituted 1-adamantanecarboxylic acid, or one having one or two of the substituents R, is caused to react with thionyl chloride to form the corresponding unsubstituted or substituted 1-adamantanecarboxylic acid chloride. This reaction may be effected by heating the reactants, e.g., up to about reflux temperature.

The acid chloride thus obtained is converted to the 1-adamantyl-1-axiridinyl ketone by reaction with ethyleneimine, e.g., by addition of a solution of the acid chloride in an inert organic solvent such as ether to ethyleneimine in the same or similar solvent in the presence of an acid acceptor such as pyridine or alkylamine like triethylamine.

The ketone is converted to the 1-adamantaldehyde by reduction, e.g., with lithium aluminum hydride in an inert medium such as ether with cooling. This aldehyde is reacted with a thiosemicarbazide of the formula (III) 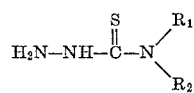

e.g., in a medium such as alcohol and then heating up to about reflux temperature.

The product thiosemicarbazone has the formula (IV) 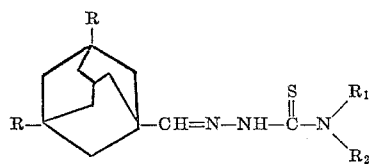

Reaction of the new intermediates of Formula IV with an oxidizing agent such as ferric chloride, hydrogen peroxide, iodine or the like in an inert solvent such as alcohol at about room temperature induces cyclization and formation of the product of Formula I. In the event the product forms as an acid salt, the free base may be obtained by neutralization with a base.

When $R_1$ is a lower alkanoyl group, the intermediate of Formula IV is acylated, e.g., with an acid anhydride such as acetic anhydride, and the N,S-diacyl compound thus produced is then cyclized by means of the oxidizing agent as described above.

In all the foregoing formulas the symbols have the same meaning as described in connection with Formula I.

The new products are useful as topical fungal disinfectants, e.g., in protecting animals against *Aspergillus niger*, *Chaetomium globosum* or the like, and may be applied topically to the affected area or to surfaces in aqueous solution or suspension, or in creams or ointments, at a concentration of about 1%, two to four times daily.

The following examples are illustrative of the invention. Temperatures are expressed on the centigrade scale.

Example 1

(A) 1-adamantanecarboxylic acid chloride.—To 18 g. of 1-adamantanecarboxylic acid, 50 ml. of thionyl chloride are added with cooling and the mixture is heated under reflux for 30 minutes. The excess of thionyl chloride is removed in vacuo, the addition of 2× 30 ml. of dry benzene (benzene dried over silica gel) and evaporation serving to remove the last traces. Anhydrous ether (30 ml.) is added, and the solution evaporated leaving 19.2 g. of 1-adamantanecarboxylic acid chloride as a brownish white solid;

$\lambda_{max.}^{Nujol}$ 5.61$\mu$ (C=O of acid chloride).

(B) 1-adamantyl-1-aziridinyl ketone.—The acid chloride obtained above is dissolved in 125 ml. of dry ether, and added dropwise with stirring (addition time 30 minutes) to a mixture of 4.3 g. of ethyleneimine and 10.1 g. of triethylamine, dissolved in 200 ml. of dry ether, and cooled in an ice-salt mixture. After completing the addition, the ice-bath is removed, and the mixture is stirred for another 30 minutes. The solid triethylamine hydrochloride that precipitates is filtered off, washed with ether and dried. The ethereal solutions of the 1-adamantyl-1-aziridinyl ketone obtained are combined and made up to 400 ml. with dry ether $\lambda_{max.}^{Nujol}$ single broad peak at 5.9$\mu$ (amide C=O). The dry ethereal solution of the product is used as such for the next step.

(C) Preparation of LAH solution.—To 9 g. of lithium aluminum hydride, 200 ml. of dry ether are added, and the mixture is heated gently under reflux for 8 hours. The suspension is then allowed to stand at room temperature for two days, and the clear supernatant liquid is drawn off. The clear solution is analyzed for the LAH content by allowing an aliquot to evaporate at room temperature and then drying at 110° for 2 hours. Usually ca. 0.4 M solution results by this procedure.

(D) 1 - adamantaldehyde. — 1-adamantyl-1-aziridinyl ketone in dry ether (400 ml. of 0.1 M solution) is transferred to a 1 liter 3-necked flask fitted with an additional funnel, stirrer and protected by silica gel drying tubes. The flask is cooled in an ice-bath (external temp. 0–3°), and to this cooled solution of 1-adamantaldehyde-1-aziridinyl ketone in dry ether, 75 ml. of 0.33 M LAH solution in dry ether are added dropwise with stirring (addition time 45 minutes). After the addition, the mixture is stirred for 30 minutes at the temperature of the ice-bath, and for an additional 30 minutes after removing the cooling bath. The reaction mixture is then treated with 200 ml. of 10% sulfuric acid. The ethereal layer is separated, washed successively with 2× 100 ml. of water, 100 ml. of saturated sodium bicarbonate solution and finally with 200 ml. of water. The ethereal layer is dried overnight over anhydrous $MgSO_4$. Evaporation of ether gives 1-adamantanecarboxaldehyde as a thick pale yellow oil.

(E) 1 - adamantanecarboxaldehyde 3 - thiosemicarbazone.—To a solution of 2.5 g. of 1-adamantanecarboxaldehyde in 40 ml. of absolute alcohol, a warm solution of 1.4 g. of thiosemicarbazide dissolved in a mixture of 50 ml. of water and 2 ml. of glacial acetic acid is added. The mixture is refluxed on a steam bath for 30 minutes. On cooling 1-adamantanecarboxaldehyde 3-thiosemicarbazone is obtained as a voluminous mass of yellow-white crystals, M.P. 187–189°. An analytical sample is obtained by recrystallizing from methanol-water and drying at 75° in vacuo, M.P. 193–194°.

Analysis. — Calc'd for $C_{12}H_{19}N_3S$: C, 60.66%; H, 8.07%; N, 13.51%. Found: C, 60.68%; H, 8.16%; N, 13.41%.

(F) 2 - (1 - adamantyl) - 5 -amino - 1,3,4 - thiadiazole hydrochloride.—2.3 g. of 1-adamantanecarboxaldehyde 3-thiosemicarbazone are dissolved in 25 ml. of warm 95% alcohol. To this solution 20 ml. of 1 M ferric chloride solution are added and the mixture stirred overnight at room temperature. The solution is filtered and concentrated to give 2-(1-adamantyl)-5-amino-1,3,4-thiadiazole hydrochloride as a white solid. It is crystallized from 95% alcohol to give yellowish white crystals, M.P. 262–264°.

Analysis.—Calc'd for $C_{12}H_{17}N_3S \cdot HCl$: C, 53.10%; H, 6.70%; N, 16.44%; S, 11.83%. Found: C, 53.62%; H, 7.01%; N, 16.38%; S, 12.15%.

(G) 2-(1-adamantyl)-5-amino-1,3,4-thiadiazole. — To 700 mg. of 2-(1-adamantyl)-5-amino-1,3,4-thiadiazole hydrochloride 20 ml. of warm alcohol are added. The solution is cooled and made alkaline with dilute ammonia solution. The precipitate that separates upon dilution is extracted with chloroform. Evaporation of the chloroform solution leaves a white solid, 500 mg. It is recrystallized from alcohol-water to give shiny white crystals, M.P. 200–203°. $\tau CdCl_3$ 7.96 (10H), 8.23 (6H), 4.39 (2H).

*Analysis.* — Calc'd for $C_{12}H_{17}N_3S$: C, 61.25%; H, 7.28%; N, 17.86%. Found: C, 61.32%; H, 7.65%; N, 17.91%.

Example 2

(A) 4-methyl-3-thiosemicarbazide.—To a solution of 20.5 g. (0.28 mole) of methylisothiocyanate in 200 ml. of ethanol, 15 ml. of 95 l. hydrazine hydrate diluted with 10 ml. of water are added. The solution is shaken for 10 minutes, cooled, and the precipitate is collected and crystallized from methanol to give 27.3 g. (93 l. yield) of 4-methyl-3-thiosemicarbazide, M.P. 136.5–137°.

(B) Adamantaldehyde 4 - methyl - 3 - thiosemicarbazone.—A solution of 3.3 g. (0.02 mole) of adamantaldehyde in 50 ml. of absolute alcohol is treated with 2.1 g. (0.02 mole) of 4-methyl-3-thiosemicarbazide, following the procedure of Example 1(E) to give the product.

(C) 2 - (1 - adamantyl) - 5 - methylamino - 1,3,4-thiadiazole hydrochloride.—Following the procedure of Example 1F, 2.4 g. of adamantaldehyde 4-methyl-3-thiosemicarbazone is treated with 20 ml. of 1 M ferric chloride solution to give 2-(1-adamantyl)-5-methylamino-1,3,4-thiadiazole hydrochloride.

Example 3

(A) 4,4-diethyl-3-thiosemicarbazide.—10.4 g. of diethylthiocarbamylthioglycolic acid are dissolved in 25 ml. of 2 N sodium hydroxide solution. This is then treated with 5 ml. of hydrazine hydrate for 3–4 hours. On cooling, 2.9 g. (40 l. yield) of product, M.P. 84–85° is obtained.

(B) 3-methyl-1-adamantaldehyde.—Following the procedure of Example 1(A–D), but using 19.4 g. of 3-methyl-1-adamantanecarboxylic acid as starting material, 3-methyl-1-adamantaldehyde is obtained.

(C) 3 - methyl - 1 - adamantaldehyde 4,4 - diethyl - 3-thiosemicarbazole.—Following the procedure of Example 1(E), a solution of 3.56 g. of 3-methyl-1-adamantaldehyde is reacted with 2.38 g. of 4,4-diethyl-3-thiosemicarbazide to obtain 3-methyl-1-adamantaldehyde 4-diethyl-3-thiosemicarbazone.

(D) 2 - (3 - methyl - 1 - adamantyl) - 5 - diethylamino-1,3,4-thiadiazole hydrochloride.—Following the procedure of Example 1(F), employing 2.89 g. of 3-methyl-1-adamantaldehyde 4-diethyl-3-thiosemicarbazone and 20 ml. of 1 M merric chloride solution, 2-(3-methyl-1-adamantyl) - 5 - diethylamino - 1,3,4 - thiadiazole hydrochloride is obtained.

Example 4

(A) 4-benzyl-3-thiosemicarbazide. — A solution of 14.9 g. (0.1 mole) of benzylisothiocyanate in 100 ml. of ethanol is reacted with 6 ml. of 95 l. hydrazine hydrate as in Example 2(A) to give 12.6 g. (70 l. yield) of 4-benzyl-3-thiosemicarbazide, M.P. 130°.

(B) 3-chloro-1-adamantaldehyde.—Following the procedure of Example 1(A–D), but employing 21.6 g. (0.1 mole) of 3-chloro-1-adamantanecarboxylic acid, 3-chloro-1-adamantaldehyde is synthesized.

(C) 3-chloro-1-adamantaldehyde 4-benzyl-3-thiosemicarbazone.—Following the procedure of Example 1(E) by reacting 3.97 g. (0.02 mole) of 3-chloro-1-adamantaldehyde with 3.06 g. of 4-benzyl-3-thiosemicarbazide, 3 - chloro - 1 - adamantaldehyde 4-benzyl-3-thiosemicarbazone is obtained.

(D) 2 - (3 - chloro - 1 - adamantyl) - 5 - benzylamino-1,3,4-thiadiazole hydrochloride.—Following the procedure of Example 1(F), employing 3.33 g. (0.01 mole) of 3 - chloro - 1 - adamantaldehyde 4 - benzyl - 3 - thiosemicarbazone and 20 ml. of 1 M ferric chloride solution, 2 - (3 - chloro - 1 - adamantyl) - 5 - benzylamino - 1,3,4- thiadiazole hydrochloride is obtained. The free base is obtained by the procedure of Example 1(G).

Example 5

(A) 3,5-dimethyl-1-adamantaldehyde.—Following the procedure of Example 1(A–D), employing 20.9 g. (0.1 mole) of 3,5-dimethyl-1-adamantanecarboxylic acid, 3,5-dimethyl-1-adamantaldehyde is produced.

(B) 3,5-dimethyl-1-adamantaldehyde 3-thiosemicarbazone.—Following the procedure of Example 1(E) employing 3.8 g. of 3,5-dimethyl-1-adamantaldehyde and 1.4 g. of thiosemicarbazide, 3,5-dimethyl-1-adamantaldehyde 3-thiosemicarbazone is obtained.

(C) 3,5-dimethyl-1-adamantaldehyde 3-thiosemicarbazone N,S-diacetate.—To 2.4 g. (0.01 mole) of 3,5-dimethyl-1-adamantaldehyde 3-thiosemicarbazone, 10 ml. of acetic anhydride is added and the mixture is refluxed for 30 minutes. The reaction mixture is then poured into ice water and the precipitate is collected and washed with distilled water. It is subsequently crystallized from methanol-water to give shiny white crystals of the diacetate.

(D) 2 - (3,5 - dimethyl-1-adamantyl)-5-acetamino-1,3, 4-thiadiazole.—To a solution of 1.75 g. (0.005 mole) of 3,5-dimethyl-1-adamantaldehyde 3-thiosemicarbazone N,S-diacetate in 75 ml. of methyl alcohol cooled to 0°, a solution of 4.0 g. of hydrogen peroxide (100 vol.) in 10 ml. of glacial acetic acid is added dropwise and the mixture is stirred at 0° for 15 minutes. The mixture is allowed to warm up to room temperature and subsequently refluxed for 30 minutes. The solvent is removed in vacuo and hexane added when the product is precipitated. It is crystallized from a mixture of chloroform and hexane.

Example 6

(A) 4-(1-adamantyl)-3-thiosemicarbazide.—A solution of 19.3 g. (0.1 mole) of adamantylisothiocyanate (synthesized from adamantylthiourea by refluxing with acetic anhydride) is reacted with 6 ml. of 95 l. hydrazine hydrate as in Example 2(A) to give 4-(1-adamantyl)-3-thiosemicarbazide.

(B) 3-acetamido-1-adamantaldehyde.—Following the procedure of Example 1(A–D) employing 23.8 g. (0.1 mole) of 3-acetamido-1-adamantanecarboxylic acid, 3-acetamido-1-adamantaldehyde is obtained.

(C) 3-acetamido-1-adamantaldehyde 4-(1-adamantyl)-3-thiosemicarbazone.—Following the procedure of Example 1(E) by reacting 2.21 g. (0.01 mole) of 3-acetamido-1-adamantaldehyde with 1.98 g. (0.01 mole) of 4-(1-adamantyl)-3-thiosemicarbazide, 3-acetamido-1-adamantaldehyde 4-(1-adamantyl)-3-thiosemicarbazone is obtained.

(D) 2 - (3 - acetamido-1-adamantyl)-5-(1-adamantylamino)-1,3,4-thiadiazole hydrochloride.—Following the procedure of Example 1(F) employing 4.28 g. (0.01 mole) of 3-acetamido-1-adamantaldehyde 4-1-adamantyl-3-thiosemicarbazone and 20 ml. of 1 M ferric chloride solution, 2-(3-acetamido-1-adamantyl)-5-(1-adamantylamino)-1,3,4-thiadiazole hydrochloride is obtained.

Example 7

(A) 4-β-hydroxyethyl-3-thiosemicarbazide.—To a solution of 12.2 g. of ethanolamine in 40 ml. of concentrated ammonium hydroxide, a mixture of 15 ml. of carbon disulfide and 50 ml. of alcohol is added gradually at 30–40°. After complete dissolution of the $CS_2$ has occurred, the solution is allowed to stand for an hour. Then an equivalent amount of the sodium salt of chloracetic acid is added followed by 20 ml. of a 50% solution of hydrazine hydrate. The filtered solution is boiled for an hour and reduced to half its initial volume when crystals of 4-β-hydroxyethyl-3-thiosemicarbazide appear, M.P. 114–115°.

(B) 3,5-dibromo-1-adamantaldehyde.—Following the procedure of Example 1(A–D), employing 33.9 g. (0.1 mole) of 3,5-dibromoadamantanecarboxylic acid, 3,5-dibromo-1-adamantaldehyde is obtained.

(C) 3,5 - dibromo - 1-adamantaldehyde 4-(β-hydroxyethyl)-3-thiosemicarbazone.—Following the procedure of Example 1(E) and reacting 3.2 g. (0.01 mole) of 3,5-dibromo-1-adamantaldehyde with 1.1 g. (0.01 mole) of 4 - β - hydroxyethyl - 3-thiosemicarbazide, 3,5-dibromo-1-adamantaldehyde 4-(β-hydroxyethyl)-3-thiosemicarbazone is produced.

(D) 2 - (3,5 - dibromo - 1 - adamantyl)-5-(β-hydroxyethylamino)-1,3,4-thiadiazole hydrochloride.—Following the procedure of Example 1(F) employing 4.11 g. (0.01 mole) of 3,5-dibromo-1-adamantaldehyde 4-(β-hydroxyethyl)-3-thiosemicarbazone and 20 ml. of 1 M ferric chloride solution, 2-(3,5-dibromo-1-adamantyl)-5-(β-hydroxyethylamino)1,3-4-thiadiazole hydrochloride is obtained.

Similarly by following the procedure of Example 1 utilizing other substituted adamantaldehydes together with variously substituted thiosemicarbazides, additional products of Formula I above are obtained.

What is claimed is:
1. A member of the group consisting of compounds of the formula

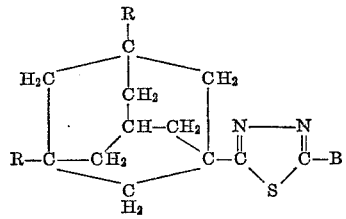

and acid addition salts thereof; wherein R is a member of the group consisting of hydrogen, halogen, trihalomethyl, lower alkyl, lower alkoxy, phenyl, amino, lower alkanoylamino, lower alkylamino and di(lower alkyl) amino, B represents the radical

wherein $R_1$ and $R_2$ each is a member of the group consisting of hydrogen, adamantyl, $(R)_n$-adamantyl, lower alkyl, lower alkanoyl, hydroxy-lower alkyl, phenyl-lower alkyl, N-(lower alkyl), phenyl(lower alkyl), cyclo-lower alkyl and together $R_1$ and $R_2$ are $(R)_n$-tetramethylene, $(R)_n$-pentamethylene, $(R)_n$-hexamethylene, $(R)_n$-oxatetramethylene, $(R)_n$-oxapentamethylene, $(R)_n$-azatetramethylene, $(R)_n$-azapentamethylene, $(R)_n$-azahexamethylene, $(R)_n$-thiatetramethylene, and $(R)_n$-thiapentamethylene, and $n$ is an integer from 0 to 2.

2. Acid addition salts of compounds of claim 1.

3. A compound as in claim 1 wherein $n$ is 0 and B is amino.

4. Acid addition salts of the compound of claim 3.

5. A compound as in claim 1 wherein $n$ is 0 and B is lower alkylamino.

6. A compound as in claim 1 wherein $n$ is 0 and B is di-lower alkylamino.

7. A compound as in claim 1 wherein $n$ is 0 and B is dimethylamino.

References Cited
UNITED STATES PATENTS
2,623,877  12/1952  Zienty _____ 260—306.8

ALEX MAZEL, Primary Examiner

A. M. T. TIGHE, Assistant Examiner

U.S. Cl. X.R.

260—240, 243, 244, 247.1, 250, 256.5, 268, 293.4, 306.7, 306.8, 552; 424—246, 248, 250, 267, 270

PO-1050
(5/69)

UNITED STATES PATENT OFFICE
CERTIFICATE OF CORRECTION

Patent No. 3,483,204              Dated December 9, 1969

Inventor(s) Venkatachala L. Narayanan and Jack Bernstein

It is certified that error appears in the above-identified patent and that said Letters Patent are hereby corrected as shown below:

Column 1, the first formula, line 22 should appear as follows:

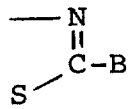

Column 3, line 13, "axiridinyl" should read --aziridinyl--
Column 5, line 3, "Cd" should read --CD--. Column 5, line 50, "merric" should read --ferric--.

SIGNED AND
SEALED
AUG 18 1970

(SEAL)
Attest:

Edward M. Fletcher, Jr.
Attesting Officer

WILLIAM E. SCHUYLER, JR.
Commissioner of Patents